(12) United States Patent
Bondar et al.

(10) Patent No.: US 8,086,354 B2
(45) Date of Patent: Dec. 27, 2011

(54) OPTIMIZING CONSUMPTION OF RESOURCES

(75) Inventors: Vitaliy Bondar, San Jose, CA (US); Ching-Hua Chen-Ritzo, Mahopac, NY (US); Rick Allen Hamilton, II, Charlottesville, VA (US); Clifford Alan Pickover, Yorktown Heights, NY (US); Ralph Peter Williams, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 12/551,191

(22) Filed: Aug. 31, 2009

(65) Prior Publication Data

US 2011/0054642 A1 Mar. 3, 2011

(51) Int. Cl.
*G06F 19/00* (2011.01)
(52) U.S. Cl. .......................................... 700/284; 239/68
(58) Field of Classification Search .................. 700/284, 700/291, 32, 29; 239/68, 69, 71, 74
See application file for complete search history.

(56) References Cited

U.S. PATENT DOCUMENTS

| 6,169,964 | B1 | 1/2001 | Aisa et al. |
| 6,437,692 | B1* | 8/2002 | Petite et al. ................... 340/540 |
| 6,618,709 | B1 | 9/2003 | Sneeringer |
| 6,944,523 | B2* | 9/2005 | Addink et al. ............... 700/284 |
| 7,093,551 | B2 | 8/2006 | Saho et al. |
| 7,317,927 | B2* | 1/2008 | Staton et al. ............... 455/456.4 |
| 7,317,972 | B2 | 1/2008 | Addink et al. |
| 2008/0228325 | A1 | 9/2008 | Schindler |

* cited by examiner

*Primary Examiner* — Kidest Bahta
(74) *Attorney, Agent, or Firm* — Vazken Alexanian; Ryan, Mason & Lewis, LLP

(57) ABSTRACT

Methods, systems and apparatus for optimizing consumption of one or more resources are presented. For example, a method may be implemented on a processor device and includes obtaining user preferences for the consumption of resources that include water and electricity, predicting the consumption of, and a first metric for the consumption of, the resources for each of a plurality of first time periods, determining a projected second metric for the consumption of the resources during a second time period according to the predicted consumption and the predicted first metric, and optimizing the consumption of the resources according to the projected second metric and the user preferences. The second time period includes the plurality of first time periods. The first metric is associated with the user preferences and at least one of the plurality of first time periods. The second metric indicates full or partial projected attainment of the preferences during the second time period.

25 Claims, 2 Drawing Sheets

OPTIMIZING CONSUMPTION OF RESOURCES

FIELD OF THE INVENTION

The present invention relates generally to consumption of resources and related expenditures. More particularly, the invention relates to optimizing consumption of resources according to user preferences.

BACKGROUND OF THE INVENTION

Resources may be, for example, natural resources, processed natural resources, energy and manufactured resources. Examples of natural resources are water, coal, gold, natural gas, oil, and minerals. Filtered or purified water, gasoline, refined oil and jewelry containing gold are examples processed natural resources. Steel may be considered a manufactured resource (i.e., steel) or a processed natural resource (i.e., iron). Natural resources generally take a very long time to create, but may be used relatively rapidly, or there may be relatively little in existence, leading to a scarcity of those resources. Some processed and manufactured resources are expensive to process or manufacture. Additionally, there is usually an expense associated with transporting resources.

As areas of the world become more developed, there are more people competing for existing resources, especially natural or processed natural resources. Some resources, for example, water and air, are becoming more polluted, for example, due to industrialization, especially in developing countries, greater resource use, and relatively dense population concentrations of people. Consequently, the demand for some resources is increasing and the availability of some resources and the quality of some resources are declining. The relative availability and demand for resources, especially resources of high quality, are market mechanisms that affect the price of the resources, in many cases in an upward direction. It is noted that the availability of a resource, the quality of a resource or the value or price of a resource may be geographically dependent.

Water is a precious resource. Climate shifts and weather patterns often cause local scarcities of water for consumption which may result in water use restrictions. Quality water for consumption is, at least in some locals, becoming scarce, or in some areas, nonexistent. Consequently, the price of supplied water (e.g., water supplied by a public or private water system) has been increasing and may continue to increase and become more time-dependent. Because, in some areas, prices of water have, at least in the past, been relatively low, consumers of water have traditionally not been overly conscious of water prices during daily customary consumption of water, and existing water saving measures may have been adequate from an economic perspective, if not from an environmental perspective.

There are many appliances and devices in the household that consume water, for example, washing machines, dishwashers, power washers, commodes, showers, and lawn and garden watering devices. Some home water devices have been designed to reduce water usage, such as, low flow shower heads and low flush commodes.

A number of methods can be used to determine the price of a resource such as water. The price can be set directly by the resource provider (e.g., a water utility). Within a certain area or congregation of water users, the price can also be determined in a market-based matter, such as with auctions or other bidding methods.

SUMMARY OF THE INVENTION

Principles of the invention provide, for example, methods, systems and apparatus for optimizing consumption of one or more resources.

For example, in accordance with one embodiment of the invention, a method for optimizing consumption of two or more resources is presented. The method may be implemented on a processor device and includes: obtaining one or more user preferences for the consumption of the two or more resources, the two or more resources comprising water and electricity consumed in at least one resource consuming task; predicting the consumption of the two or more resources for each of a plurality of first time periods; predicting a first metric for the consumption of the two or more resources for each of the plurality of first time periods; determining a projected second metric for the consumption of the two or more resources during a second time period according to the predicted consumption and the predicted first metric, and optimizing the consumption of the two or more resources according to the projected second metric and according to the one or more user preferences. The second time period comprises the plurality of first time periods. The first metric is associated with the one or more user preferences and at least one of the plurality of first time periods. The projected second metric indicates full or partial projected attainment of the one or more user preferences during the second time period. One or more of the steps of obtaining one or more user preferences, predicting the consumption, predicting a first metric, determining a projected second metric, and optimizing the consumption are executed on the processor device.

In accordance with another embodiment of the invention, a system for optimizing consumption of two or more resources is provided. The system comprises modules for implementing the above method for optimizing consumption of two or more resources.

In accordance with yet another embodiment of the invention, apparatus for optimizing consumption of two or more resources is provided. The apparatus includes a memory and a processor coupled to the memory. The apparatus is operative to perform the above method for optimizing consumption of two or more resources.

In accordance with one more embodiment of the invention, an article of manufacture for optimizing consumption of two or more resources is provided. The article of manufacture is tangibly embodying a computer readable program code which, when executed, causes the computer to carry out the steps of a computer implemented method for optimizing consumption of two or more resources according to the above method for optimizing consumption of two or more resources.

In accordance with an additional embodiment of the invention, a method for optimizing consumption of one or more resources is presented. The method may be implemented on a processor device and includes obtaining one or more user preferences for the consumption of the one or more resources by a resource consuming device comprising an informing device, predicting the consumption of the one or more resources for each of a plurality of first time periods; predicting a first metric for the consumption of the one or more resources for each of the plurality of first time periods; determining a projected second metric for the consumption of the one or more resources during a second time period according to the predicted consumption and the predicted first metric, optimizing the consumption of the one or more resources according to the projected second metric and according to the one or more user preferences, and providing a user with information related to the optimization of the consumption of the one or more resources, the information provided by the informing device. The second time period comprises the plurality of first time periods. The first metric is associated with the one or more user preferences and at least one of the plurality of first time periods. The projected second metric indicates full or partial projected attainment of the one or more user preferences during the second time period. One or more of the steps of obtaining one or more user preferences, predicting the consumption, predicting an expenditure, determining a projected total expenditure, optimizing the consumption, and providing a user with information are executed on the processor device.

Principles of the invention provide, for example, convenient and automated methods that facilitate water savings by consumers; control times at which, and the manner in which, water consuming devices are used in order to control or limit the cost of the water used; and a system to automatically monitor time variations in water prices and to indicate to a user when a price is at a temporary high or a temporary low.

DETAILED DESCRIPTION OF THE INVENTION

Some exemplary embodiments of the present invention are described herein with reference to consumption or use of water to illustrate and provide a specific domain for application of the disclosed techniques. However, embodiments of the invention are applicable to other fields of resources including, but not limited to, natural resources, energy and manufactured resources.

Consumption comprises use or utilization of goods, services or resources.

An expenditure may be a cost for goods, services, resources or use thereof and may include, for example, time, labor, money or anything, tangible or intangible, given up for the goods, services, resources or use thereof. As an example, an expenditure may be what must be given, expended, done or undergone to obtain the goods, services, resources or use thereof. An expenditure may or may not include a price paid (e.g., a monetary price). An expenditure may, for example, comprise harm to the environment or an effect on society.

It is anticipated that water utility prices will become time-dependent, if not already so, because utility providers may: discourage uses during particular seasons, at particular times of day, or during times associated with certain source water states (e.g., when a river flow drops below a given threshold); encourage overnight as opposed to daytime irrigation; discourage water discharges associated with particular water related states (e.g., when it is raining); optimize the amount and timing of energy usage for obtaining, processing and providing water (e.g., pumping and water treatment); encourage the accumulation during low peak hours and the storage of water for subsequent use; and respond to changes in water quality. Water quality changes can be the result of naturally occurring events or as a result of human activity. Water quality also may also change with the seasons, temperature, flow volume, turbidity and biological activity. People can cause changes in water quality that may be a result of industrial, agricultural, municipal or recreational activities.

There are several dimensions to water delivery which may influence water price, for example, pressure, temperature, and quality. Water may have an acceptable or an unacceptable range of organic (e.g., components of fertilizer, chemicals, gasoline and oil), inorganic (e.g., components of industrial wastes and batteries), biological, mineral and other chemical contamination levels which may influences the market price of water. The amount of dissolved oxygen available in water is an important factor in determining the types of organisms that can survive in the water. Other characteristics of water that may influence water price include: oxygen and dissolved gas level (e.g. chlorine), turbidity, taste, color, odor, pH, phosphorous values and heavy metals.

It is further anticipated that the approach of purchasing in advance and storing water at a local site before using the water may become more widely used.

Aspects of the invention provide convenient and automated methods that facilitate water savings by consumers and by sets of consumers, such as, members of a local municipality. Because consumers have not traditionally had a strong knowledge or awareness of water costs, features of the invention may convey water costs and related knowledge when the consumer is using a water consuming device (a water appliance) in a home, office or other location.

If the price of water increases significantly, existing water saving technologies, such as flow reducing devices, may not be sufficient for limiting the cost of water utility bills. If water prices are not only high, but variable, then consumers (i.e., users) may find it advantageous to optimize not only water flow rates for water consuming appliances, but the time at which the appliance is operated. A prevailing time-dependent price of water impacts the cost of the water consumed and, according to aspects of the invention, impacts when water consumption occurs. Embodiments of the invention control times at which water consuming devices are used to control or limit the cost of the water used.

Embodiments of the invention may include a system (e.g., an intelligent system) to automatically monitor time variations in commodity prices (e.g., water prices) and to indicate to a user when a price is at a temporary high or a temporary low. This may impact when the user uses, or may use in the future, a water consuming device. The indication to the user may be at a location associated with the device. The system may identify local or temporary minima/maxima, may take "high/low" cost indication from utility provider, monitor historical variations, or use some combination of these source data. For example, a visual, tactile, or audio indicator provides the user with information that can indicate whether the current time, or a future time, is economically and/or environmentally optimal to use the device. In addition, the system can be programmed by the user to automatically actuate (e.g. turn on or off) the device, for example based on the price range or other criteria. Time limits may be applied such that a water consuming operation will execute or complete by a certain time regardless of commodity prices, for example, if a dishwasher run cycle should be completed by 7 AM, then such override functionality can optionally ensure that the run cycle is completed, even if the commodity price was not within the desired price range during the stated time interval.

Embodiments of the invention may comprise systems for controlling expenditure and other parameters for water. The systems may receive spot usage information and/or spot prices and extrapolate water-use expense based upon current and predicted consumption rates, current and predicted prices, and historical chronological variations thereof (e.g., time of day, day of week). Such analyses may be used to predict the water bill cost for a current billing period. The system may, optionally, download current prices for use in calculation or may download price data either in real time or in periodic batch bursts. The system may also include an analysis of electric, gas, and other utility use. If water usage is about to exceed prescribed budget (i.e. a threshold value), the system may suggest corrective action so that bills can be constrained. The system may also automatically actuate such corrective actions.

Exemplary features of the invention provide pricing based automation which can have significant impact on reducing consumption costs with minimal user effort. For example, a user can program a system to run a dishwasher when the price of water is within a specific range. A price range would typically work better than a specific price point by eliminating local and system level hysteresis, that is, frequent startup/shutdown cycles on a local level (e.g., home or dishwasher) summing to larger oscillations on a higher level (e.g., neighborhood or city) caused by many people operating water consuming devices when the price reaches the same, or nearly the same, price threshold and then turning off the devices when the price increases to just above the price threshold. The increase in price may actually be due to higher time-dependent demand caused by the automation itself.

One embodiment of the invention may receive input from multiple water consuming devices and coordinate a water-budget strategy based on the combined requirements, constraints, preferred operating schedules, and other parameters of the water consuming devices.

Figure 1:
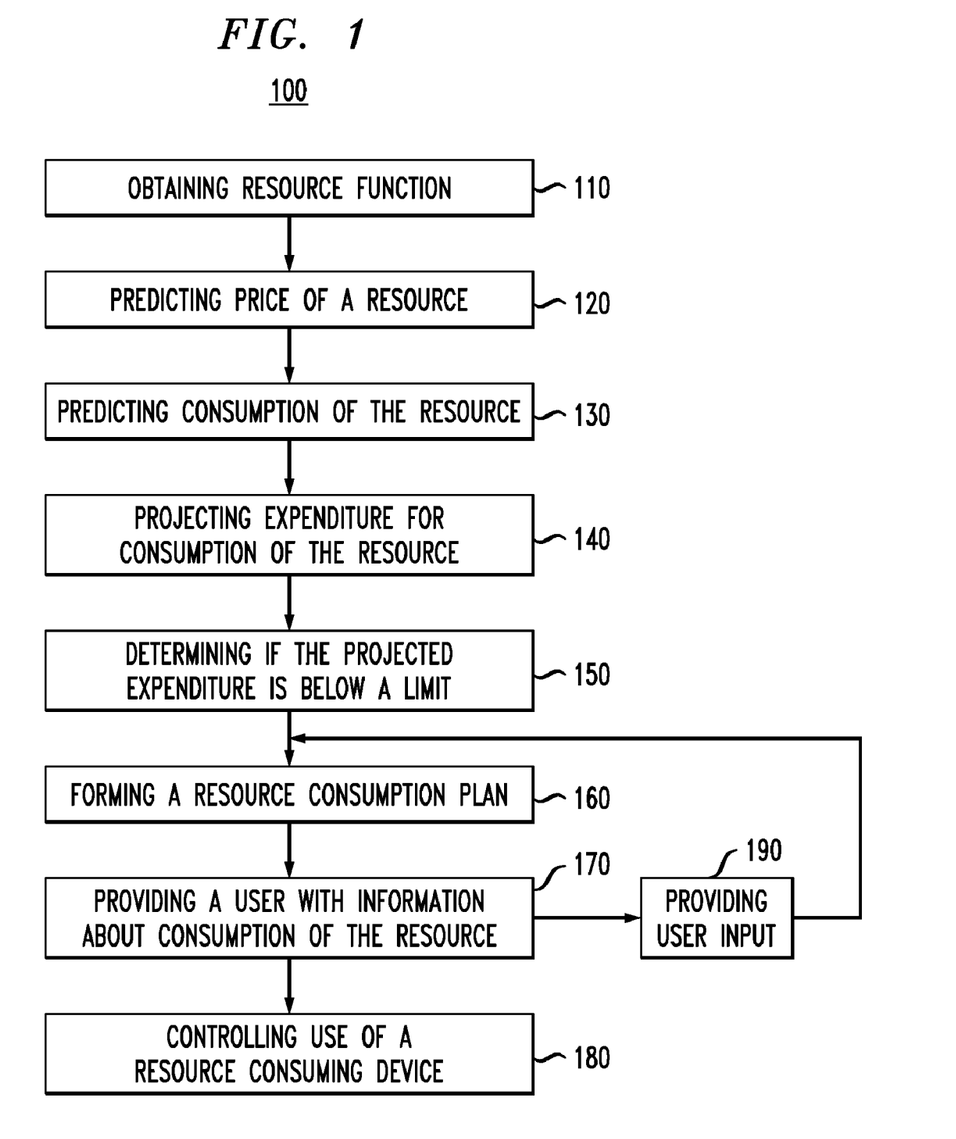
FIG. 1 shows a flow diagram of a method for optimizing consumption of a resource, according to an embodiment of the present invention.

In another embodiment of the invention, all or portions of methods of the invention may be performed remotely (e.g., one or more of the steps of method 100). By way of example only, a service may provide information to a user regarding resource usage, for example, suggesting time of day to run a dishwasher or to fill a water storage device that stores water for later use. The service may directly control the operation of a water consuming device on the premise (e.g., home, office or business) of the user. The service may be provided by or to governments, businesses, landlords and home owners.

Certain embodiments of the invention comprise optimizing or arranging consumption or use of one or more resources. The optimization or arrangement for consumption or use of the resources may comprise factors or dimensions other than, or in addition to, price or expenditure, such as factors or dimensions contained in the resource function described below.

FIG. 1 is a flow diagram of method 100 for optimizing consumption of a resource, according to an exemplary embodiment of the invention. By way of example only, the resource is water. Other examples of resources are energy including electricity, oil, gasoline and gas (e.g., natural gas or propane). Resources may be, for example, natural resources, processed natural resources or manufactured resources, such as certain compounds. All or any of the steps of method 100 may be implemented on a processor device coupled to a memory. In the described embodiment, application of method 100 is to control the expenditure for a resource during a billing period, as an example, to control the expenditure for water from the beginning time to the end time of a water billing cycle or period. Although method 100 includes predicting price of a resource, dimensions associated with consumption of a resource, other than price, are contemplated, for example, user supplied preferences, factors or dimensions described included in a resource function. Also contemplated are predictions, other than predictions of resource consumption, of other resource related dimensions, such as those associated with the resource function.

The first step 110 of method 100 comprises obtaining, by a user preference obtaining module, a resource function (e.g., a multi-dimensional resource function). For example, a user may provide the resource function (e.g., user determined or user specified the resource function). The user, for example, may be associated with the consumption of resources, the operation of resource consuming devices or associated with implementation methods of the invention (e.g., methods 100 and 200). The resource function may include price or expenditure for a resource(s), and/or other dimensions or factors pertaining to quality of the resource(s), a characteristic of the resource(s), convenience to the user of use or consumption of the resource(s), and/or preferences of the user related to use or consumption of the resource(s). A characteristic of a resource may include, for example, a distinguishing quality, an aspect or a quality of the resource, or a measurable property of the resource. For example, characteristics of electricity may include voltage, current, stability, fluctuations in voltage, cost or availability; and characteristics of water may include temperature, flow rate and other flow dynamics including pressure, contamination, color, cost, availability, or quality. For example, a user convenience factor may be related to, or a measure of, convenience or inconvenience of consumption of the resource in a particular manner. As an example, it would be inconvenient to wait until 3 am to shower in order to use water during an off-peak water consumption period. Likewise, it would be inconvenient (e.g., unhealthy) to wait for extend periods of time (e.g., three months) to consume water and/or electricity to wash dishes or clothes. Preferences may include, for example, consuming the resource in a socially responsible manner or in a way that conserves the resource. For example, a social responsibility factor may be related to, or a measure of, actions, efforts or desires of the user to limit or promote personal use of resources (e.g., water and/or electricity) for reasons that pertain to the environment or to society. The resource function may, for example, represent or model consumption of a resource(s) arranged for utility for the user (e.g., arranged to maximize the utility of resource consumption for the user). As an example, the resource function may be associated with the consumption of water and electricity, the operation of a resource consuming device that consumes water and electricity in association with a resource consuming task, or associated with implementation methods of the invention (e.g., methods 100 and 200) related to the consumption of water and electricity.

The second step comprises predicting the price of the resource, for example, by an expenditure prediction module. The price may be predicted at a number of future time points. The time points may be specific points in time or periods or intervals of time. The time points may be contiguous, for example, contiguous first time periods or intervals that completely span a larger second time period. Alternately, the time points may be time intervals that have gaps in time between them. In the method 100, the time points are contiguous time intervals comprised by the billing period. The prices of the resource may change over time, that is, the price may be time dependent.

The second step 120 may further comprise obtaining resource procurement information, for example, resource price, resource quality, resource availability, a cost associated with procuring the resource, other financial information, resource market information, and time points at which the prices, quality, availability and other obtained resource procurement information apply. The procurement information may be current (i.e., represent the present time), historical (i.e., represent a past time), or future (i.e., an estimate representing a future time). The predictions of the prices of the resource may be according to the obtained resource information, for example, historical price information obtained from a resource supplier. The obtained resource information may be obtained and/or received by, for example, an expenditure prediction module comprising a wireless receiver configured to receive a wireless signal comprising the resource price or other resource procurement information. The expenditure prediction module may automatically monitor the price of the resource over some time period (e.g., a current time or time period, and/or a past time or time period). Monitoring may be one time, continuous or discrete at specific intervals. The price of the resource may be time-dependent, in which case the monitoring may monitor price fluctuations over time. The monitored information may be used to predict future price of the resource and future temporary maximum or minimum prices. For example, the price of the resource may be predicted to be at a temporary maximum price or at a temporary minimum price at the current time or at a future time or time point.

The resource procurement information may be provided by, for example, a landlord, a condominium association, a company, a water authority, a municipality or other agent, and may comprise threshold or limit parameters that are used in the other steps of method 100, for example, the eighth step 180, i.e., controlling use of a resource consuming device.

There are a number of secondary factors that may be used to predict the price of a resource. Because the use of a first resource (e.g., water) may be associated with the use of a second resource (e.g., energy for pumping and water treatment), the market price of the second resource can be used to predict the price of the first resource or to predict the total price of all resources required to perform a resource consuming task. In addition, the scarcity of a resource, (e.g., water), based on a current or predicted future supply/demand environment, can be used to predict or determine the price of the resource or to determine or predict the total price of all resources required to perform a resource consuming task. The method used to price a resource, for example, by the resource provider, may be considered in predicting the price of a resource. A method to price a resource may be, for example, the provider determining the price in a market-based manner (e.g., auctions or other bidding methods).

Simulations may be used to predict the price of a resource, for example, simulation of weather events or conditions, demand for water and/or other resources (e.g., community or regional demand), special events (e.g., conventions, festivals or other activities providing consumers having demand affecting price, and demand for and quality of the resources), economic factors, physical events, and factors or natural disasters (e.g., a flood, an earthquake, or extensive destruction of structures or resources). Other exemplary simulations to predict the price of a resource include: simulations comprising time-dependent resource usage; climate; resource availability; the amount or timing of energy usage for obtaining, processing and providing the resource; the accumulation of the resource during low demand hours and the storage of the resource for subsequent use; resource quality; human activity; seasonal factors; temperature; flow rate; flow volume; turbidity; biological activity; changes in resource quality that may be a result of industrial, agricultural, municipal or recreational activities; resource pressure; resource contamination; resource mineral or chemical content (e.g., oxygen, chlorine, dissolved gas, phosphorous or heavy metals); and the taste; color; odor; or pH of the resource. Furthermore, exemplary simulations for predicting the price of a resource may be simulations of one or more processes, for example, a process to purify water or other resource, a process to manufacture or refine a resource, or a process to obtain or mine a natural resource.

To make the resource procurement information more actionable and easier for users to understand, the price of water may be provided or calculated not only on a per-unit basis (e.g., per gallon of water), but as a cost, or an approximate cost, for an operation performed by the associated water consuming device (e.g., the cost of running a dishwasher cycle at a specific setting).

Resource procurement information may be received by, for example, information push or pull mechanisms and by using standard interfaces, such as those provided by RSS (Rich Site Summary) technologies. The resource procurement information may contain a header that contains information that allows for efficient routing of the resource procurement information to a plurality of devices in a home, or for other purposes. The resource procurement information may conform to a standard, e.g. a standard format.

The third step 130 comprises predicting, for example, by a consumption prediction module, consumption of the resource. Consumption is predicted, for example, for each of the future time points. Consumption comprises consumption of the resource by one or more resource consuming devices, for example, consumption of water by a washing machine, a dishwasher, another washing device, a commode, a sink, a water heater, a cooling, a faucet, or a heating or humidifying device that uses water or a storage device for storing water. Other examples of a resource consuming devices for resources other than water are: electric appliances, vehicles powered by gasoline, natural gas or other energy resource, and storage devices for any type of energy or resource. It is expected that consumption of the resource changes with time, that is, consumption is time dependent.

The third step 130 may further comprise obtaining resource consumption information, for example historical or past resource usage. Historical resource usage may be, for example, a function of past time, weather and resource prices. The predictions of consumption of the resource may be according to the resource consumption information. The prediction of usage or consumption of the resource may comprise one or more simulations of consumption related factors as described below.

Simulations may be used to predict the usage or consumption of a resource, for example, simulation of weather events or conditions, demand for water (e.g., community or regional demand), special events (e.g., conventions, festivals or other activities affecting the usage or consumption of the resource), economic factors, and physical events or factors (e.g., a flood, an earthquake, or extensive destruction of structures or resources). Other exemplary simulations to predict the consumption of a resource include: simulations comprising time-dependent resource usage; climate; resource availability; the amount or timing of energy usage for obtaining, processing and providing the resource; the accumulation of the resource during low demand hours and the storage of the resource for subsequent use; resource quality; human activity; seasonal factors; temperature; flow rate; flow volume; turbidity; biological activity; changes in resource quality that may be a result of industrial, agricultural, municipal or recreational activities; resource pressure; resource contamination; resource mineral or chemical content (e.g., oxygen, chlorine, dissolved gas, phosphorous or heavy metals); and the taste; color; odor; or pH of the resource. Furthermore, exemplary simulations for predicting usage or consumption of a resource may be simulations of one or more processes, for example, a process to purify water or other resource, a process to manufacture or refine a resource, or a process to obtain or mine a natural resource.

The fourth step 140 comprises projecting, predicting or determining expenditure for the consumption of the resources during the billing period. The fourth step 140 may be performed by, for example, an expenditure projection module. The projection, prediction or determining is according to the prediction of resources prices obtained in the second step 120 and the prediction of consumption of the resource obtained in the third step 130. The projection, prediction or determining may also take into account resource consumption, and the price thereof (and thereby, resource expenditure) for consumption of the resource during the billing period for the time prior to when the projection, prediction or determining of the expenditure is made.

EQ. 1, below, is an example of an equation for projecting, at a time during the billing period (t), the expenditure ($E_{Total}$) for the billing cycle.

$$E_{Total}(t) = E_1(t) + \Sigma_i(P_{Pi} \times P_{Ci}) \quad \text{EQ. 1}$$

The total expenditure for the billing period ($E_{Total}$) equals the expenditure incurred during the billing period up until time t, $E_1(t)$, plus the projected expenditure during the billing period after time t. The projected expenditure during the billing period after time t is the summation, over all remaining time intervals i remaining during the billing period (i.e., remaining after time t), of the predicted price ($P_{Pi}$) for time interval i multiplied by the predicted consumption ($P_{Ci}$) for time interval i. $\Sigma_i$ is therefore the sum over time intervals i from time t to time T, where time T is the end of the billing period.

EQ. 2, below, is an alternate example of an equation for projecting, at a time during the billing period (t), the expenditure ($E_{Total}$) for the billing cycle.

$$E_{total}(t) = E_1(t) + \int_t^T P_P(\tau) P_C(\tau) d\tau \quad \text{EQ. 2}$$

EQ. 2 replaces the summation $\Sigma_i$ with an integral as shown. $P_P(\tau)$ represents a price function, over timer comprising the plurality time periods after time t, of a predicted price of at least one of the one or more resources, and $P_C(\tau)$ represents a consumption function, over timer of a predicted consumption of the one or more resources.

Periods of time other than billing periods are contemplated for projecting, predicting or determining expenditure for the consumption of the resources, for example, daily, monthly or yearly periods of time, or a period of time corresponding to a planning interval. Other examples of periods of time for projecting, predicting or determining expenditure for the consumption of the resources are periods of time corresponding to an event or a period of time that is in some way unusual or that has an identifiable characteristic. An event may be, for example, a social event such as a convention or a festival, a weather event, a catastrophic event or an event of nature.

In a broader sense, the fourth step 140 comprises projecting, predicting or determining a first metric(s) for the consumption of the resources, for example, a first metric(s) which is related to or associated with the user preferences. The metric may, for example, be intended to indicate full or partial attainment of the user preferences. The metric may be, for example, an expenditure during one or more of the first time periods or during each of the first time periods. The metric may be projected for each of a plurality of first time periods that, together, are comprised by a second time period. As an example, the first time periods are hours within a month, and the second time period is the month comprising the hours.

The broader aspects of the fourth step 140 may further comprise projecting, predicting or determining a second metric, for the consumption of the resources during the second time period. The second metric may, for example, indicate full or partial projected attainment of the user preferences during the second time period. Projecting, predicting or determining the second metric takes into account the predicted consumption and/or the predicted first metric. The second metric may be, for example, an expenditure for the consumption of the resources during the second time period.

The fifth step 150 comprises determining, for example, by a determination module, if the projected expenditure is below a predetermined limit. In the described embodiment, the predetermined limit is a budgeted amount of money allotted to purchase the recourse during the billing period. The projected expenditure is compared against the limit. If the projected expenditure is below the limit, no action is needed. If the projected expenditure is above the limit, action is needed to reduce the expenditure to be at or below the limit. The action may be contained in a resource consumption plan.

The sixth step 160 comprises forming, for example, by a plan formation module or by an optimization module, a resource consumption plan. The resource consumption plan may, for example, provide for optimization of consumption or use of resources according to the resource function obtained in the first step 110. The plan may arrange consumption of resources, for example, schedule consumption or schedule the operation of resource consuming devices, to optimize consumption according to user specified preferences or other factors supplied by the resource function.

Another purpose of the plan may be, for example, to provide for arranging or reducing consumption so that a projected expenditure is at or below the limit. For example, if a first projected expenditure is above a limit, a plan is formed to operate resource consuming devices such that a second projected expenditure indicates that operation of the resource consuming devices according to the plan will result in expenditure below the limit. The second projected expenditure is projected in a manner similar to the projection of the first projected expenditure but considers a revised predicted consumption resulting from expected adherence to the resource consumption plan.

Accordingly, in an embodiment of the invention, a plan is formed for optimizing consumption of resources during a period of time according to a first projected total expenditure during the period of time and/or according to user specified preferences. It is then determined if the projected total expenditure for the resources deviates from optimum by a predetermined amount or is above a predetermined threshold. If the projected total expenditure is determined to deviate from optimum by the predetermined amount or is above the predetermined threshold, a second projected total expenditure may be determined. The optimization of the consumption is used in control of use of one or more resource consuming devices, for example, when the projected total expenditure is determined to deviate from optimum by the predetermined amount or is above the predetermined threshold. The resource consuming devices consume the resources addressed by the resource consumption plan. In this way a resource consumption plan may be formed where a revised projected total expenditure (e.g., the second or subsequent projected total expenditure) deviates from optimum by less than the predetermined amount. The revised projected total expenditure for the consumption of the resources during the period of time is according to the optimization of the consumption of the resources.

The plan may include one or more rules for the operation of one or more resource consuming devices, e.g., the time of operation, operation when a price of a resource is within a specified range or below a specified limit, and operation with limited consumption of a resource.

An exemplary resource consumption plan may include any of the following actions: user water restriction (e.g., decreased water flow, decreased heating of water, turning off water or hot water to certain sinks in a home or business), and/or an alerting action (e.g., an alert message sent to a computer of the user, and an alert message sent to a third party).

Another exemplary resource consumption plan considers multiple water consuming devices and coordinates a water-budget strategy based on the combined requirements, constraints, preferred operating schedules, and other parameters of the water consuming devices.

The seventh step 170 comprises providing, for example, by a user information module, a user of the resource consuming devices information regarding the consumption of the resource, for example, related to the optimization of the consumption of the one or more resources. The information may comprise, for example, instructions or recommendations to operate a resource consuming device at the present time or at some specific future time. By way of additional examples, the information may include prices of the resource, quality indicators of the resource, availability indicators of the resource, one or more costs associated with procuring the resource, one or more points in times or intervals of time, (e.g., time points corresponding to prices, quality indicators or availability indicators of the resource), a signal to use the resource consuming device or that it is being automatically controlled and used, a signal that the resource price is at a temporary maximum, and a signal that the resource price is at a temporary minimum. Any of the signals may be, for example, a visual, auditory or tactile indicator, provided by informing devices. Costs associated with procuring resources may, for example, be energy costs associated with providing the resource (e.g., the cost of electricity to run a pump to supply water) or energy costs associated with consuming the resource (e.g., the cost of electricity to operate a washing machine that consumes water). The information may represent historical information or predicted information. Optionally, the user information module, may process data associated with the predicted price, the predicted consumption, the projected expenditure, the one or more rules, and/or other data, for example, data provided to the expenditure prediction module or to the consumption prediction module. The processing, for example, may determine whether or not to provide information to the user and what information to provide.

The information may be provided or displayed, for example, by an informing device such as a display, for example, a character, liquid crystal, or light emitting diode display. The information may be provided at the location at or near the resource consuming device, for example, provided by a light or other indicator mounted on, attached to or part of the resource consuming device. For example, the location is considered to be at or near the resource consuming device if it is within the room or within ten feet of the resource consuming device. Alternately, the information may be provided at a location not in the immediate vicinity of the resource consuming device, for example a control center or a remote computer.

The information may contain, for example, a header that contains information that allows for efficient routing of the information to a plurality of devices in a home or for other purposes. The information may conform to a standard, e.g. a standard format.

The information may also include an explanation to the user for the instructions, recommendations or other information provided.

Optionally, information may be provided interactive, for example, the user can suggest changes to the instructions or recommendations. In the ninth step 190, after first receiving information about consumption of the resource in the seventh step 170, the user may provide input (e.g., instruction, such as information, restrictions, requirements, and preferences) for modification or reformation of the resource consumption plan in a repeat of the sixth step 160 and regarding the information provided in the seventh step 170. Thus, there is a feedback loop comprising the sixth step 160, the seventh step 170, and the ninth step 190, so that method 100 may, for example, re-optimize the instructions, recommendations and information provided in the seventh step 170 and/or the resource consumption plan formed in the sixth step 160 based on user input (e.g., user feedback or user preferences) regarding the initial or an earlier provided information about consumption of the resource.

The order of execution of the sixth step 160, the seventh step 170 and the ninth step 190 may differ from the order described above. For example, the ninth step 190 may be executed prior to initial execution of either or both of the sixth step 160 or the seventh step 170 in order to provide user input to formation of the resource consumption plan (sixth step 160) or to the provided information about consumption of the resource (seventh step 170).

The eighth step 180 comprises controlling or operating the use of one or more resource consuming devices, for example, according to the rules or according to the plan. The eighth step 180 is performed by, for example, a control module or a user. By way of example only, the energy consuming device may be controlled during time periods when the price of the resource is predicted to be at or near a temporary minimum price or at or near a temporary minimum price. The energy consuming device may be operated or turned on when the price is predicted to be at or near a temporary minimum and not operated (turned off), or operated in a manner to reduce or minimize the amount of resource used, when the price is predicted to be at or near a temporary maximum. The use is controlled such that the projected expenditure is at or below the predetermined limit. Use or operation of the energy consuming devices may be by the user or by a system (e.g., a software system, a hardware system or a system comprising both software and hardware), for example by a resource consumption management system. The control module is also an example of the system and may be, for example, a resource consumption management system or part of a resource consumption management system. The user may program the system, for example, to automatically actuate one or more water consuming devices, to provide information to the user, to obtain historical information (e.g., price or consumption information), and to perform specific processing of specified data.

Use of the resource consuming device may be controlled by, for example, using or determining to use the resource consuming device at a present time, not using or determining not to use the resource consuming device at the present time, and using or determining to use the resource consuming device at a future time. The future time may be a postponement of operation or operation at a specific future time.

There may be other considerations, besides the predicted price of a resource, the predicted consumption of the resource and the projected expenditure for consumption of the resource that determine use of a resource controlling device. By way of example only, the other considerations may be resource quality, resource availability, the chronological time, and a cost associated with procuring the resource, other than the predicted price of the resource.

If a first projected expenditure is above a predetermined limit, use or operation of one or more resource consuming device is such that a second projected expenditure is below the predetermined limit. For example, operation of the devices is according to a resource consumption plan that was formed in the sixth step 160 to operate the resource consuming devices such that a second projected expenditure indicates that operation of the resource consuming devices according to the plan will result in expenditure below the limit. The second projected expenditure is projected in a manner similar to the projection of the first projected expenditure but considers a revised predicted consumption resulting from expected adherence to the resource consumption plan.

Figure 2:
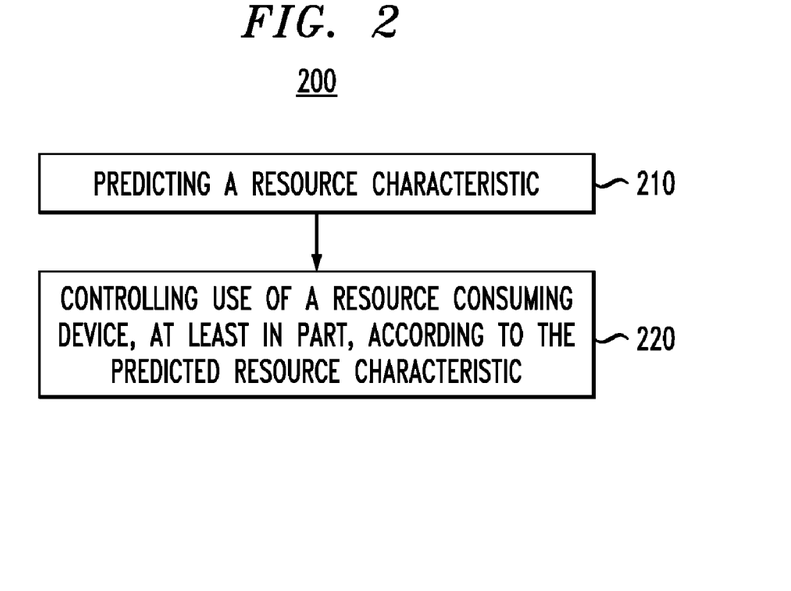
FIG. 2 shows a flow diagram of a method for controlling use of a resource according to a resource characteristic and according to an exemplary embodiment of the invention.

FIG. 2 is a flow diagram of method 200 for controlling use of a resource according to a resource characteristic and according to an exemplary embodiment of the invention.

The first step 210 of method 200 comprises predicting, for example, by a characteristic prediction module, a resource characteristic other than the predicted price of the resource, for example, resource quality, resource availability, and a cost associated with procuring the resource. The resource characteristic may be predicted for one or more time points or time periods, for example, the time points associated with the predicted price and consumption of method 100.

The second step 220 comprises controlling use of the resource consuming device, at least in part, according to the predicted resource characteristic. The second step 220 may be performed by, for example, the control module. For example, the resource may be water, the resource consuming device may be a clothes washing machine, and the predicted resource characteristic may be the iron, salt or particulate content of the water. The iron, salt or particulate content of the water may be predicted according to past known content (e.g., known by monitoring or by published data). It is desired to wash only when the iron, salt or particulate content of the water is low, so as not to discolor the clothes, to have the clothes feel soft or to prevent undesirable odor on the clothes. The washing machine may be scheduled to, if loaded, operate at times of day or times of the week when the iron, salt or particulate content of the water is predicted to be low or at or near a predicted minimum, and/or to not operate at times of day or times of the week when the iron, salt or particulate content of the water is predicted to be high or at or near a predicted maximum.

Method 200 may be used independently of method 100 or may be used in conjunction with method 100 such that consumption of the resource is according to the predicted price, the predicted consumption (and, consequently, the projected expenditure for consumption) and the predicted resource characteristic.

Some embodiments of the invention address the use or consumption of more than one resource. Some resource consuming devices, systems or appliances use or consume more than one resource. For example, many water consuming devices, such as washing devices, consume water and electricity or other fuel. Water pumping and water storage devices may use water and electricity. Water heating devices may use water and fuel (e.g., natural gas, propane, oil or electricity). Many manufacturing devices consume resources and fuel in the manufacturing process. These embodiments of the invention determine the price of or expenditure for each resource (e.g., the expenditure for or the price of water or electricity), and determine the best time to consume all applicable resources. Methods 100 and 200 may be applied to embodiments of consumption of more than one resource. In method 100, as shown in FIG. 1, the singular "resource" is replaced by the plural "resources," where resources comprise more than one resources used by a resource consuming device or system. Thus, in the second step 120 of method 100, the price of all applicable resources is predicted. In the third step 130, the consumption of all applicable resources is predicted. In the fourth step 140, the projected expenditure is for the consumption of all applicable resources. Similarly, the remaining steps of method 100 apply or consider all applicable resources. For EQ. 1 to represent the expenditure ($E_{Total}$) for all applicable resources, additional summation terms may be added, where there is a summation term corresponding to each of the applicable resources. EQ. 2 may likewise be expanded by including an integral term for each applicable resource. In other embodiments of the invention, consumption of a resource is according to one or more of predicted price, predicted consumption, projected expenditure for consumption, at least one predicted resource characteristic, and chronological time. In certain embodiments, the consumption of the resource is consumption within the home environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 and 2, which are flow diagrams or flowchart of the methods 100 and 200, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Accordingly, techniques of the invention, for example as depicted in FIGS. 1 and 2, can also include, as described herein, providing a system, wherein the system includes distinct modules (e.g., software modules, hardware modules and modules comprising both software and hardware). By way of example only, the modules may include: the expenditure prediction module, the consumption prediction module, the expenditure projection module, the determination module, the plan formation module, the user information module, the control module, and the characteristic prediction module. The modules may be configured, for example, to perform the steps of method 100 and 200 shown in FIGS. 1 and 2, respectively.

Figure 3:
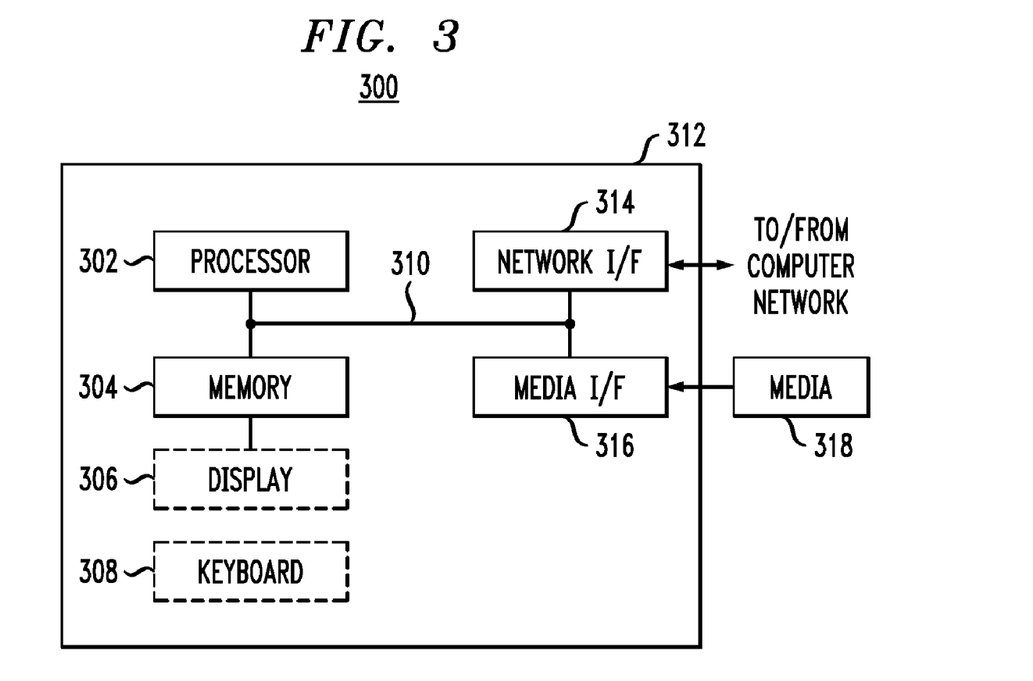
FIG. 3 depicts a computer system that may be useful in implementing one or more aspects and/or elements of the invention.

One or more embodiments can make use of software running on a general purpose computer or workstation. With reference to FIG. 3, such an implementation employs, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

A data processing system suitable for storing and/or executing program code can include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 308, display 306, pointing device, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, implemented on a processor device, for optimizing consumption of two or more resources, the method comprising the steps of:
    obtaining one or more user preferences for the consumption of the two or more resources, the two or more resources comprising water and electricity consumed in at least one resource consuming task;
    predicting the consumption of the two or more resources for each of a plurality of first time periods;
    predicting a first metric for the consumption of the two or more resources for each of the plurality of first time periods, wherein the first metric is associated with the one or more user preferences and at least one of the plurality of first time periods;
    determining a projected second metric for the consumption of the two or more resources during a second time period, comprising the plurality of first time periods, according to the predicted consumption and the predicted first metric, wherein the projected second metric indicates full or partial projected attainment of the one or more user preferences during the second time period; and
    optimizing the consumption of the two or more resources according to the projected second metric and according to the one or more user preferences;
    wherein one or more of the steps of obtaining one or more user preferences, predicting the consumption, predicting a first metric, determining a projected second metric, and optimizing the consumption are executed on the processor device.

2. The method of claim 1, wherein the one or more user preferences comprise at least one of: an expenditure, a price, a characteristic, a quality factor, a social responsibility factor, a conservation factor, and a user convenience factor.

3. The method of claim 1, wherein the user provides instruction for at least one of: (i) forming a resource consumption plan comprising one or more rules for operation of one or more resource consuming devices, and (ii) providing the user with information related to the consumption of the two or more resources.

4. The method of claim 1, wherein the step of optimizing the consumption comprises at least one of: (i) scheduling a time for the consumption of the two or more resources, (ii) scheduling a time for the consumption of the two or more resources when a price of at least one of the two or more resources is below a specified upper threshold, and (iii) operation of one or more resource consuming devices with limited consumption of at least one of the two or more resources.

5. The method of claim 1, wherein one or more simulations are used in at least one of the steps of predicting the consumption and predicting a first metric, the one or more simulations comprising simulations of at least one of: climate, weather, demand for at least one of the two or more resources, time-dependent usage of at least one of the two or more resources, an economic factor, a natural disaster, availability of at least one of the two or more resources, energy usage related to at least one of the two or more resources, quality of at least one of the two or more resources, human activity, and a process involving the two or more resources.

6. The method of claim 1, wherein at least one of the first metric and second metric comprise an expenditure for the two or more resources, the expenditure comprising what is given to obtain at least one of the two or more resources.

7. The method of claim 1, wherein the second metric comprise a projected total expenditure for the two or more resources during the second time period, the method further comprising the step of:
    determining if the projected total expenditure is above a predetermined limit, wherein the method is operable to control use of one or more resource consuming devices when the projected total expenditure is above the predetermined limit such that a revised projected total expenditure is below the predetermined limit; and
    forming a resource consumption plan comprising one or more rules for operation of the one or more resource consuming devices when the projected total expenditure is above the predetermined limit.

8. The method of claim 1 further comprising the steps of:
    obtaining procurement information for at least one of the two or more resources, wherein the step of predicting a first metric is according to the procurement information; and
    obtaining consumption information for the at least one of the two or more resources, wherein the step of predicting the consumption of the two or more resources is according to the consumption information.

9. The method of claim 8, wherein the procurement information comprises at least one of: (i) a price of the at least one of the two or more resources, (ii) a quality of the at least one of the two or more resources, (iii) an availability of the at least one of the two or more resources, (iv) a cost associated with procuring the at least one of the two or more resources, and (v) one or more chronological times.

10. The method of claim 8, wherein the consumption information comprises historical usage of the at least one of the two or more resources as a function of at least one of: (i) time, weather, and the at least one of the two or more resources.

11. The method of claim 1, wherein the step of predicting a first metric comprises predicting that a price of at least one of the two or more resources, during a specific time period, is at least one of: a temporary maximum price and a temporary minimum price; and
    wherein the use of one or more resource consuming devices is controlled during the specific time period and according to at least one of: the prediction of the temporary maximum price, and the prediction of the temporary minimum price.

12. The method of claim 1, wherein the use of one or more resource consuming devices is controlled by at least one of: (i) determining to use one of the one or more resource consuming devices at a present time, (i) determining not to use one of the one or more resource consuming devices at the present time, (iii) determining to use one of the one or more resource consuming devices at a specific future time, and (iv) a resource management system.

13. The method of claim 1 further comprising the step of:
predicting a resource characteristic, for at least one of the plurality of first time periods, the resource characteristic comprising at least one of: resource quality, resource availability, and a cost associated with procuring at least one of the two or more resources;
wherein the use of one or more resource consuming devices is controlled according to the predicted resource characteristic.

14. The method of claim 1, wherein the step of determining a projected second metric for the consumption the two or more resources is according to at least one of equation 1 and equation 2;
wherein equation 1 is:

$$E_{Total}(t) = E_1(t) + \Sigma_i(P_{Pi} \times P_{Ci});$$

wherein equation 2 is:

$$E_{total}(t) = E_1(t) + \int_t^T P_P(\tau) P_C(\tau) d\tau;$$

and
wherein $E_{Total}(t)$ represents the projected total expenditure, $E_1(t)$ represents an expenditure for consumption of at least one of the two or more resources incurred during the second time period prior to a time t of the determining of the projected total expenditure, $P_{Pi}$ represents a predicted price of at the least one of the two or more resources for one of the plurality of first time periods, $P_{Ci}$ represents a predicted consumption of the at least one of the two or more resources for the one of the plurality of first time periods, i indicates the one of the plurality of first time periods, $\Sigma_i(P_{Pi} \times P_{Ci})$ represents a summation of $(P_{Pi} \times P_{Ci})$ for each of the plurality of first time periods occurring after time t; $P_P(\tau)$ represents a price function, over time $\tau$ comprising the plurality of first time periods after time t, of a predicted price of the at least one of the two or more resources, and $P_C(\tau)$ represents a consumption function, over time $\tau$ of a predicted consumption of the at least one of the two or more resources.

15. The method of claim 1, wherein the second metric comprise a projected total expenditure for the two or more resources during the second time period, the method further comprising the steps of:
determining if the projected total expenditure deviates from optimum by a predetermined amount, wherein the step of optimizing the consumption is configured to control use of one or more resource consuming devices when the projected total expenditure is determined to deviate from optimum by the predetermined amount; and
determining a revised projected total expenditure for the consumption of the two or more resources during the second time period, the revised total expenditure is determined according to the optimization of the consumption of the two or more resources, wherein the revised projected total expenditure deviates from optimum by less that the predetermined amount.

16. A method, implemented on a processor device, for optimizing consumption of one or more resources, the method comprising the steps of:
obtaining one or more user preferences for the consumption of the one or more resources consumed by a resource consuming device comprising an informing device;
predicting the consumption of the one or more resources for each of a plurality of first time periods;
predicting a first metric for the consumption of the one or more resources for each of the plurality of first time periods, wherein the first metric is associated with the one or more user preferences and at least one of the plurality of first time periods;
determining a projected second metric for the consumption of the one or more resources during a second time period, comprising the plurality of first time periods, according to the predicted consumption and the predicted first metric, wherein the projected second metric indicates full or partial projected attainment of the one or more user preferences during the second time period;
optimizing the consumption of the one or more resources according to the projected second metric and according to the one or more user preferences; and
providing a user with information related to the optimization of the consumption of the one or more resources, the information provided by the informing device;
wherein one or more of the steps of obtaining one or more user preferences, predicting the consumption, predicting a first metric, determining a projected second metric, optimizing the consumption, and providing information are executed on the processor device.

17. The method of claim 16, wherein the step of providing a user with information provides information comprising at least one of: (i) one or more prices of the one or more resources, (ii) one or more quality indicators of the one or more resources, (iii) one or more availability indicators of the one or more resources, (iv) one or more costs associated with procuring the one or more resources, (v) one or more points in times, (vi) a signal to use one or more resource consuming devices, (vii) a signal that at least one of the one or more prices is at a temporary maximum, and (viii) a signal that at least one of the one or more prices is at a temporary minimum.

18. The method of claim 16, wherein the one or more resources comprises at least one of: water, electricity and a fuel.

19. A system for optimizing consumption of two or more resources, the system comprising:
a user preference obtaining module, configured to obtain one or more user preferences for the consumption of the two or more resources, the two or more resources comprising water and electricity consumed in at least one resource consuming task;
a consumption prediction module, configured to predict the consumption of the two or more resources for each of a plurality of first time periods;
an expenditure prediction module, configured to predict a first metric for the consumption of the two or more resources for each of the plurality of first time periods, wherein the first metric is associated with the one or more user preferences and at least one of the plurality of first time periods;
an expenditure projection module, configured to determine a projected second metric for the consumption of the two or more resources during a second time period, comprising the plurality of first time periods, according to the predicted consumption and the predicted first metric, wherein the projected second metric indicates full or partial projected attainment of the one or more user preferences during the second time period; and an optimization module, configured to optimize the consumption of the two or more resources according to the projected second metric and according to the one or more user preferences;

wherein one or more of the obtaining of the one or more user preferences, the predicting of the consumption, the predicting of the expenditure, the determining of the projected total expenditure, and the optimizing of the consumption are executed on the processor device.

20. The system of claim 19 further comprising a user information module configured to provide a user with information related to the optimization of the consumption of the two or more resources, the information provided by an informing device comprised by a resource consuming device consuming the two or more resources.

21. The system of claim 19, wherein the use of one or more resource consuming devices is controlled by at least one of: (i) a user; and (ii) a control module configured to control use of the one or more resource consuming devices.

22. Apparatus for optimizing consumption of two or more resources, the apparatus comprising:
a memory; and
a processor coupled to the memory, operative to:
obtain one or more user preferences for the consumption of the two or more resources, the two or more resources comprising water and electricity consumed in at least one resource consuming task;
predict the consumption of the two or more resources for each of a plurality of first time periods;
predict a first metric for the consumption of the two or more resources for each of the plurality of first time periods, wherein the first metric is associated with the one or more user preferences and at least one of the plurality of first time periods;
determine a projected second metric for the consumption of the two or more resources during a second time period, comprising the plurality of first time periods, according to the predicted consumption and the predicted first metric, wherein the projected second metric indicates full or partial projected attainment of the one or more user preferences during the second time period; and
optimize the consumption of the two or more resources according to the projected second metric and according to the one or more user preferences.

23. The apparatus of claim 22, wherein the processor is further operative to provide a user with information related to the optimization of the consumption of the two or more resources, the information provided by an informing device comprised by a resource consuming device consuming the two or more resources.

24. An article of manufacture tangibly embodying a computer readable program code which, when executed, causes the computer to carry out the steps of a computer implemented method for optimizing consumption of two or more resources according to claim 1.

25. An article of manufacture tangibly embodying a computer readable program code which, when executed, causes the computer to carry out the steps of a computer implemented method for optimizing consumption of two or more resources according to claim 16.

* * * * *